(No Model.)
P. J. FISH.
MACHINE FOR MAKING CURVED PIPE.
No. 411,023. Patented Sept. 17, 1889.
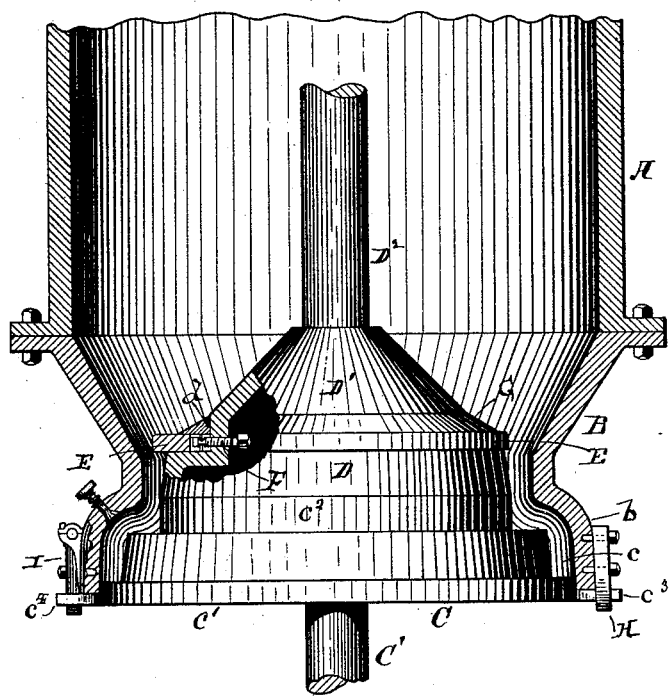
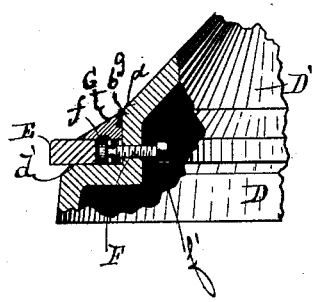
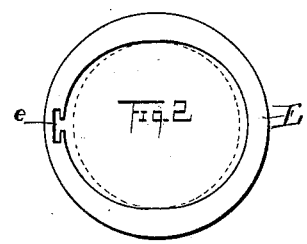
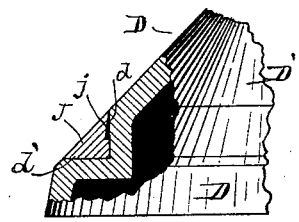
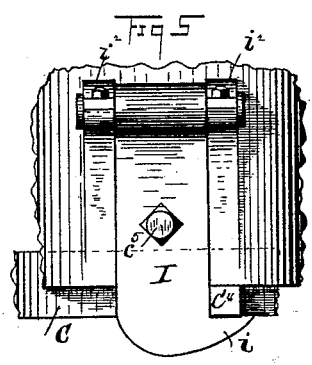
Witnesses.
Inventor
Perry J. Fish
By C. P. Humphrey
Attorney.

UNITED STATES PATENT OFFICE.

PERRY J. FISH, OF AKRON, OHIO.

MACHINE FOR MAKING CURVED PIPE.

SPECIFICATION forming part of Letters Patent No. 411,023, dated September 17, 1889.

Application filed January 30, 1889. Serial No. 298,059. (No model.)

*To all whom it may concern:*

Be it known that I, PERRY J. FISH, a citizen of the United States, residing at Akron, in the county of Summit and State of Ohio, have invented a certain new and useful Improvement in Sewer-Pipe Presses, of which the following is a specification.

My invention has relation to improvements in sewer-pipe presses in which the pipe is formed of plastic material by being forced in a continuous stream through an annular orifice and cut off in desired lengths; and the objects of my invention are, first, to provide appliances for curving said pipe as it issues from the press, and, second, to prevent injury to the curved pipe from the locking-hooks as it issues from the press.

To the above purposes my invention consists in certain peculiar and novel features of construction and arrangement, as hereinafter described, and pointed out in the claims.

In order that my invention may be fully understood, I will proceed to describe it with reference to the accompanying drawings, which form a part of this specification, and in which—

Figure 1 is a transverse vertical section of so much of a sewer-pipe press as is necessary to a clear understanding of my invention, certain other parts being omitted, as hereinafter explained. Fig. 2 is a detached plan of the internally-elliptical ring employed with said press. Fig. 3 is a view partially in transverse vertical section and partially in side elevation of a portion of the ring and adjacent parts of the mandrel on which the ring rests. Fig. 4 is a similar view of the part of the mandrel, the ring being removed therefrom. Fig. 5 is a side elevation of a portion of the cylinder-head, showing the form of hook employed by me for retaining the inner die in position.

In the drawings, A designates the lower part of the cylinder of a sewer-pipe press, and B the lower head thereof united therewith by bolts, as shown, the lower part of said head being curved outward and downward, as shown at $b$, to constitute the outer die for the socket end of the pipe and surrounds the inner die C, the two constituting a mold $c$ for said socket. The inner die C is supported upon a vertical rod C', which is connected at its lower end with the usual devices (not shown) for partially rotating and raising and lowering said die. The lower part of the die C is formed with the usual annular horizontally-extending flange $c'$ and reduced portion $c''$, the latter extending upward from the die.

D designates the mandrel, the lower part of which is of cylindrical form, and the upper part D' is of the frusto-conical form shown. The usual rod D'' extends vertically upward from the conical portion D' of the mandrel, and is braced by a spider-frame (not shown) common in this class of machines.

At the point of juncture of the conical portion D' with the base or body portion of the mandrel D is formed an annular vertical portion $d$, (see Figs. 1, 3, and 4,) thus leaving an annular horizontal ledge $d'$ at the upper part of the mandrel D. Upon the ledge $d'$ is placed a ring E, which is circular in external contour and the opening of which is of elliptical form, (see Figs. 1, 2, and 3,) the lesser diameter of said opening coinciding with the diameter of said portion $d$ of the mandrel and the greater diameter of the opening permitting the ring to be moved horizontally upon the ledge $d'$, for a purpose to be hereinafter explained.

At one side of the ring E, at one point of intersection of the line of greater diameter of the opening with the margin thereof, is formed a T-shaped recess or socket $e$, within which is inserted the enlarged head $f$ of a screw-threaded bolt F. This bolt extends horizontally through one side of the vertical portion $d$ of the mandrel D and carries at the inner end an angular head $f'$, the arrangement being such that by passing a wrench or similar implement into the mandrel D from beneath and applying it to the inner end of the bolt F the latter may be turned so as to slide the ring E upon the ledge $d'$, as required.

G designates an annulus or ring, which is triangular or wedge-shaped in cross-section and which coincides in diameter with the portion $d$ of the mandrel, at which point said ring surrounds the mandrel. The inner side of the annulus G rests snugly against the portion $d$ of the mandrel and its under side projects over the upper side of the ring E, as shown. An annular space $g$ is formed in the inner margin of the annulus G at the upper edge thereof, for a purpose to be hereinafter explained.

At opposite points on the margin of the flange $c'$ of the die C are formed two radial lugs $c^3\ c^4$, the former of which engages over the lower end of a hook H, which is rigidly bolted to the lower part of the head B, upon the opposite sides of which head is pivotally connected a hook I, the lower end of which is bent laterally, as shown at $i$, and the upper end of which is formed with two oppositely-extending lateral studs which enter horizontally-divided lugs $i''$, extending outward from the lower part of the head B. A bolt $c^5$, located midway of the hook I, serves to retain the same in its normal position.

The operation of the above-described structure is as follows: Clay is fed into the upper part of the cylinder in the usual or any preferred manner and is forced downward into the lower head B by the usual plunger (not shown) until the channel $c$ is completely filled. The die C is now partially rotated so as to disengage its lugs $c^3\ c^4$ from the hooks H I, and the die is depressed to carry it out of the lower end of the head B. The hook I is now moved outward and upward so as to clear the space at the lower end of head B, and the plunger before mentioned is gradually depressed. As the plunger descends, the pipe is gradually forced out of the lower end of the cylinder, and the ring E, being set out to the left-hand side of the mandrel the clay will be retarded in its passage on that side sufficiently to curve the pipe to the left as it emerges from the cylinder. Meanwhile a small portion of clay will have entered the recess $g$ of the ring G and be packed therein so as to act as a dam against the further and objectionable entrance of clay between ring G and portion $d$ of the mandrel. The hook I, it will be observed, swings outward entirely clear of the mass of clay passing out of the cylinder, and thus all liability of mutilating the pipe is avoided. By setting the ring E so as to cause it to project at the right-hand side of the mandrel the pipe may, if desired, be caused to curve to the right. When straight sections of pipe are to be produced, the rings E and G are removed from the mandrel and a ring J is substituted therefor. The ring J is similar in form to the ring G, but is of greater depth than the latter, so as to completely fill the space at the point of juncture of the ledge $d'$ with the vertical portion $d$. A recess $j$ is also provided in the ring J, and is similar in form and purpose to the recess $g$ of ring G.

It will thus be seen that the machine is adapted to the various requirements incident to the manufacture of both curved and straight pipe-sections, and that it produces a perfect and uniform article.

Having thus described my invention, what I claim as new therein, and desire to secure by Letters Patent, is—

1. In a press of the kind shown, a ring provided with an elliptical opening and adjustably mounted upon the mandrel and operating to retard at desired points the moving mass of clay and impart curvature to the issuing pipe, substantially as described.

2. In a press of the kind shown, the combination of the mandrel provided with a ledge, a ring having an elliptical opening and adapted to rest on said ledge, and means for moving said ring on said ledge, substantially as shown and described, and for the purpose specified.

3. The combination of the mandrel, the ring having the elliptical opening embracing said mandrel and adjustably connected thereto, and the annulus also embracing the mandrel above the point of location of the ring, substantially as shown, and for the purpose described.

4. The combination of the cylinder-head and the hook pivotally connected therewith and capable of outward vertical movement of the inner die with its outwardly-extending lug for engaging said hook, substantially as specified, and for the purpose stated.

5. The combination, with the cylinder of a sewer-pipe press, of a hook pivotally connected therewith and capable of outward vertical movement for sustaining the inner socket-die upon the lower head of the cylinder, substantially as shown and described.

6. In a press for sewer-pipe, the combination, with the mandrel having an annular outer ledge, of a ring adapted to fit said mandrel and rest on said ledge and having an internal groove to form a dam for the clay escaping between said ring and mandrel, substantially as shown and described.

In testimony that I claim the above I hereunto set my hand.

PERRY J. FISH.

In presence of—
C. P. HUMPHREY,
JOHN J. WAGONER.